J. CANAN.
Dredging-Machine Shovel.
No. 218,427. Patented Aug. 12, 1879.
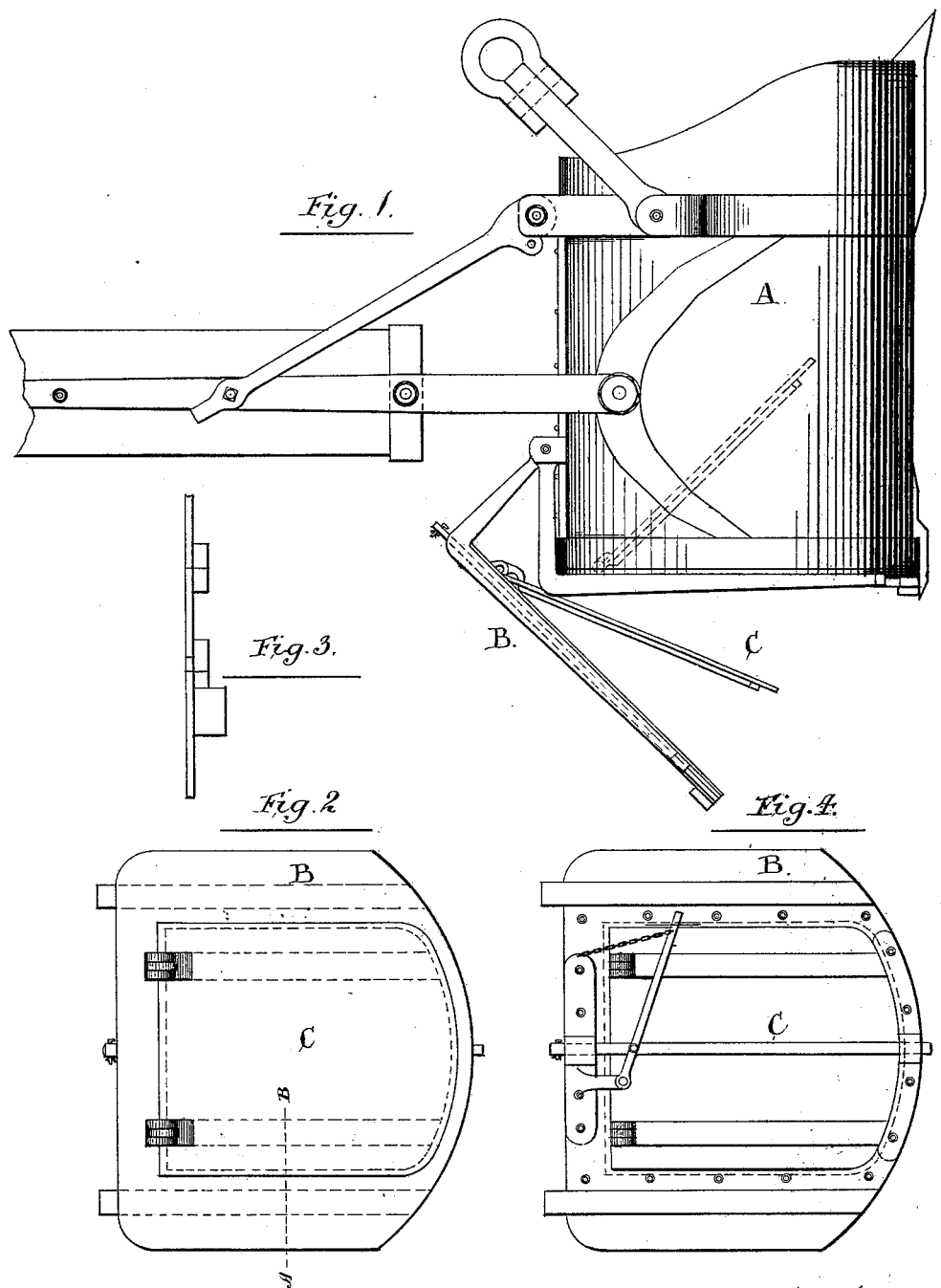

UNITED STATES PATENT OFFICE.

JAMES CANAN, OF ALLANBURG, ONTARIO, CANADA.

IMPROVEMENT IN DREDGING-MACHINE SHOVELS.

Specification forming part of Letters Patent No. 218,427, dated August 12, 1879; application filed November 22, 1878.

*To all whom it may concern:*

Be it known that I, JAMES CANAN, of the village of Allanburg, in the county of Welland and Province of Ontario, Canada, contractor, have invented certain new and useful Improvements in the Construction of Dredging-Machine Shovels, which improvements are fully set forth in the following specification and accompanying drawings.

The object of the invention is to dispense with the "backing-chains" now required to draw the shovel back, and at the same time to construct the said shovel so that it will sink through the water with the least possible resistance; and it consists in so constructing the bottom of the shovel that on striking the water the said bottom opens and allows the water to pass freely through the same.

In the accompanying drawings, Figure 1 is a side view of shovel. Fig. 2 is an inside view of bottom. Fig. 3 is a sectional view through A B. Fig. 4 is an outside view of bottom.

Those accustomed to dredging machinery are well aware of the great loss of time through the speed of the descending shovel being checked when it strikes the water, and also the injurious effect upon the shovel and other machinery connected therewith caused by the severity and repetition of these blows.

In my improved shovel I construct the bottom so that it will open inwardly immediately it comes in contact with the water, and consequently, as the displacement of the water is, comparatively speaking, *nil*, the speed of the shovel in descending is not perceptibly affected, nor is the blow as it strikes the water sufficient to do any harm.

In the drawings, A is the body of the shovel, and B the bottom thereof, which latter is hinged in the usual way, and provided with a latch of the ordinary description. I cut a hole in the bottom B as large as is possible without unduly weakening it. This hole I cover with a plate or duplex bottom, C, hinged, as shown, so as to open inwardly when the shovel strikes the water, thus permitting the water to pass freely through it; but so soon as the shovel stops moving the plate closes, covering the hole, and opening with the bottom B when the contents are to be discharged.

It will thus be seen that draw-back chains are not necessary, and that the speed of the shovel descending will not be appreciably affected when it strikes the water.

The advantage of a shovel constructed so that in descending the water will pass freely through it will be particularly noticeable when the dredge is used on a quick-running stream or river.

What I claim as my invention, and desire to secure by Letters Patent, is—

A dredging-machine shovel having its main hinged bottom B provided with a supplemental hinged plate, C, arranged, as described, so that it will open when it comes in contact with the water, allowing the water to pass freely through the shovel, as set forth.

JAMES CANAN.

Witnesses:
  C. E. BLUDORN,
  JAMES ARNOLD.

DEPARTMENT OF THE INTERIOR,
UNITED STATES PATENT OFFICE,
Washington, D. C., September 25, 1883.

In compliance with the request of the parties in interest, Letters Patent No. 218,427, granted August 12, 1879, to James Canan, of Allanburg, Ontario, Canada, for an improvement in "Dredging-Machine Shovels," is hereby limited so as to expire at the same time with Canadian patent No. 9,440, dated December 5, 1878, granted to the same party.

It is hereby certified that the proper entries and corrections have been made in the files and records pertaining to the case in the Patent Office.

This amendment is made that the United States patent may conform to the provisions of section 4887 of the Revised Statutes.

E. M. MARBLE,
*Commissioner of Patents.*

Approved:
H. M. TELLER,
*Secretary of the Interior.*